United States Patent [19]

Shtanko

[11] Patent Number: 5,120,271
[45] Date of Patent: Jun. 9, 1992

[54] VENTILATING ARRANGEMENT FOR A CAR, AND CAR PROVIDED WITH THE SAME

[76] Inventor: Julio Shtanko, 1597 N. Thompson Dr., Bay Shore, N.Y. 11706

[21] Appl. No.: 428,850

[22] Filed: Oct. 27, 1989

[51] Int. Cl.⁵ ............................................. B60H 1/26
[52] U.S. Cl. ...................................... 454/137; 454/162
[58] Field of Search .................... 98/2.01, 2.14, 2.15, 98/2.18, 41.3

[56] References Cited

U.S. PATENT DOCUMENTS

| | | | |
|---|---|---|---|
| 1,804,264 | 5/1931 | McDevitt | 98/2.18 |
| 1,975,958 | 10/1934 | Kyle | 98/2.18 X |
| 2,466,851 | 4/1949 | Honekamp et al. | 98/41.3 X |
| 2,853,932 | 9/1958 | Freyal | 98/2.18 |
| 3,418,914 | 12/1968 | Finkin | 98/2.01 |
| 3,554,110 | 1/1971 | Goetz | 98/2.18 |
| 4,478,049 | 10/1984 | Fukui et al. | 98/2.01 X |

FOREIGN PATENT DOCUMENTS

| | | | |
|---|---|---|---|
| 2551401 | 5/1977 | Fed. Rep. of Germany | 98/2.01 |
| 2803624 | 8/1979 | Fed. Rep. of Germany | 98/2.18 |
| 3309547 | 9/1984 | Fed. Rep. of Germany | 98/2.01 |
| 2491840 | 4/1982 | France | 98/2.18 |
| 126645 | 11/1978 | Japan | 98/2.01 |
| 206410 | 12/1983 | Japan | 98/2.18 |
| 2124751 | 2/1984 | Japan | 98/2.18 |
| 252019 | 12/1985 | Japan | 98/2.18 |
| 30411 | 2/1986 | Japan | 98/2.18 |

*Primary Examiner*—Harold Joyce
*Attorney, Agent, or Firm*—Alfred M. Walker

[57] ABSTRACT

A ventilating system for a car includes an exhaust fan, a carbon monoxide detector, and tubes for evacuating air from the interior of the car if carbon monoxide is present in it. The system can be provided also with a manual fan-operating switch, and formed as a unit which is easily mountable in a car.

4 Claims, 3 Drawing Sheets

VENTILATING ARRANGEMENT FOR A CAR, AND CAR PROVIDED WITH THE SAME

BACKGROUND OF THE INVENTION

The present invention relates to a ventilating arrangement for a car, and a car provided with such arrangement.

Moderns cars have been provided with air conditioning systems in an attempt to properly ventilate the interior of the cars. While the known air conditioning systems achieve certain results, they also possess some disadvantages. Since modern cars are relatively tight the stail air inside the car is not immediately forced out, so that the incoming air just increases the pressure in the interior of the car body. In connection with this, separate ventilating systems have been proposed for a separate ventilating of the car interior. The known systems do not provide detection of carbon monoxide and its immediate evacuation from the interior of the car. It is well known that carbon monoxide from the car exhaust system is a frequent cause of poisoning of car occupants, sometimes with grave consequences. The existing systems also do not have a desired degree of simplicity, for example for their simple and convenient mounting in the interior of the car. Also, they do not have signaling devices which alert a car occupant to air contamination inside the car, to take immediate measures for its elimination. It is to be understood that the ventilating systems for cars can be further improved in the above specified aspects.

SUMMARY OF THE INVENTION

Accordingly, it is an object of the present invention to provide a ventilating system for a car, which is a further improvement of existing ventilating systems.

More particularly, it is an object of the present invention to provide a ventilating system for a car, which reliably senses the presence of carbon monoxide in the interior of the car and insures its immediate evacuation.

It is also an object of the present invention to provide a ventilating system for a car, which is formed as a unit and can be removed from the car or installed in the car as a unit.

In keeping with these objects and with others which will become apparent hereinafter, one feature of the present invention resides, briefly stated, in a ventilating system which has an exhaust fan inside a car, and a tube extending from the exhaust fan outwardly to evacuate air from the interior of the car, wherein a carbon monoxide detector is provided to detect the presence of carbon monoxide in the car to turn on the exhaust fan for its evacuation.

When the ventilating system is designed in accordance with the present invention , it avoids the disadvantages of the prior art.

In accordance with another very important feature of the present invention, the system is provided with visual signal or audio signal indicators which produce respective signals in the event if carbon monoxide is present in the air inside the car, so that a car occupant becomes immediately alerted to this fact and can turn on the exhaust fan by a manual switch. This guarantees that in the event of some malfunctions on the line between the carbon monoxide detector and exhaust fan, the presence of carbon monoxide will not be undetected and not taken care of.

Still a further important feature of the present invention is that the exhaust fan. the tubes. and the detector can together form a unit which is jointly removable from and mountable in the car. This permits a user to purchase such a unit and to install it in his existing car in a simple manner.

The novel features of the present invention are set forth in particular in the appended claims. The invention itself, both as to its construction and its manner of operation will be best understood from the following description of preferred embodiments, which is accompanied by the following drawings.

DESCRIPTION OF PREFERRED EMBODIMENTS

Figure 1:
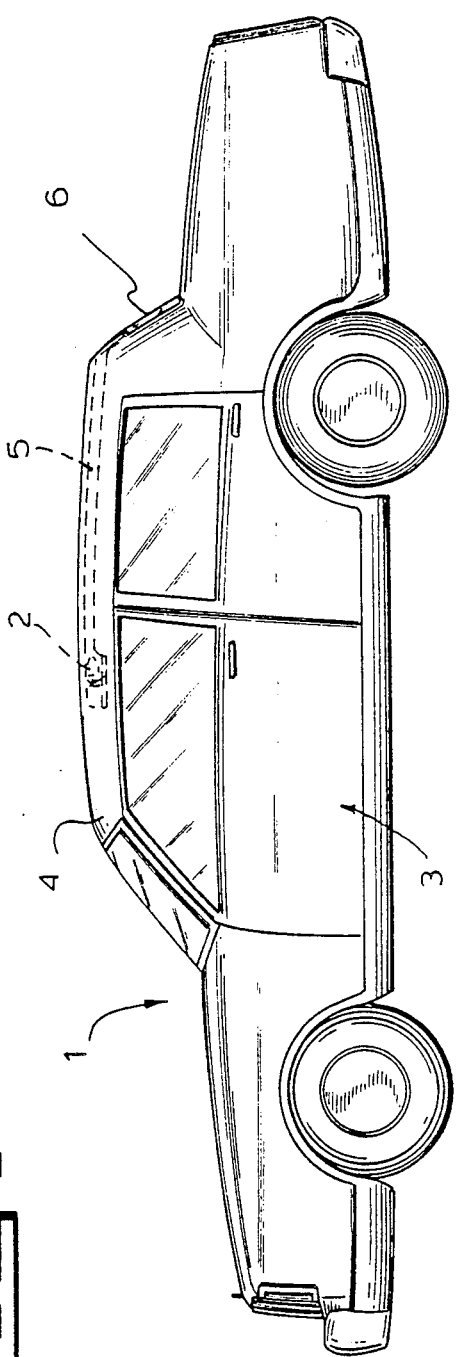
FIG. 1 is side view of a car provided with a ventilation system in accordance with one embodiment of the present invention.

A ventilating arrangement in accordance with the present invention is provided in a car which is identified as a whole with reference numeral 1. The ventilating arrangement includes an exhaust fan 2 which is located inside a car body 3 in a central region of its roof 4. The exhaust fan 2 has a well known construction and therefore not described in detail.

Figure 2:
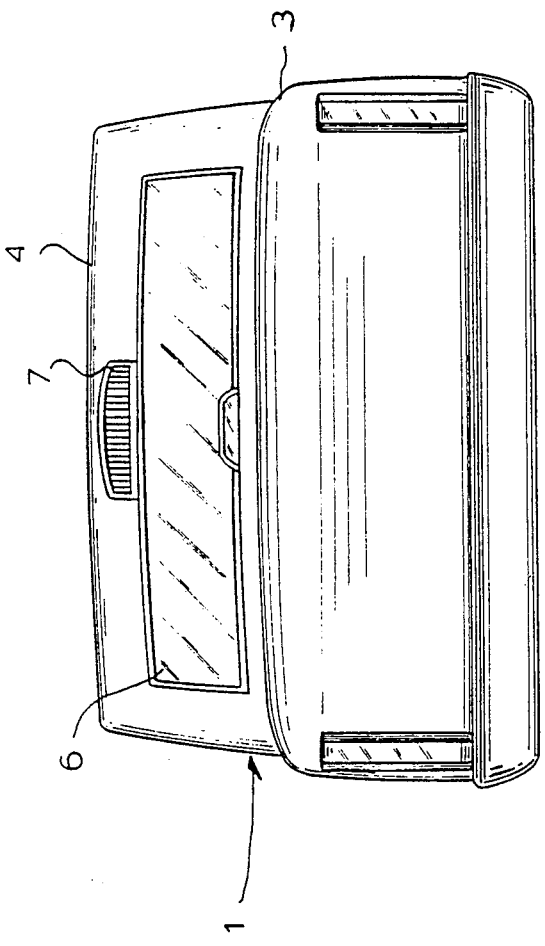
FIG. 2 is a rear view of the car of FIG. 1, showing a part of the ventilating system of this embodiment.
Figure 6:
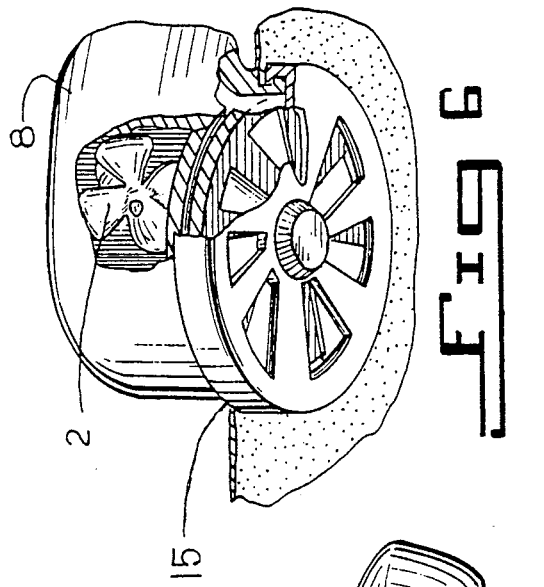
FIG. 6 is a perspective view of the fan and intake portion of the device in accordance with the present invention.
Figure 5:
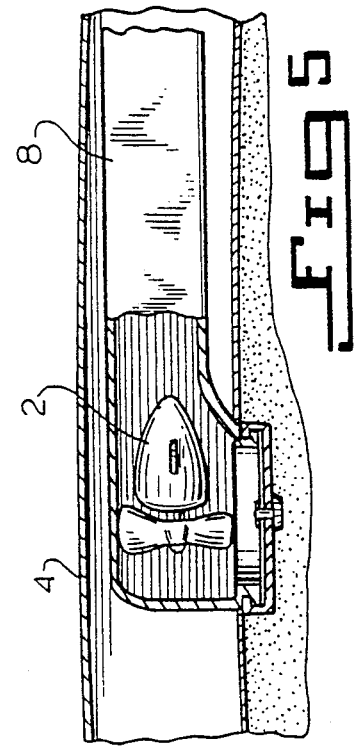
FIG. 5 is a cross sectional view of the intake and fan portion of the device in accordance with the present invention.

A defective air is aspirated by the exhaust fan from the interior of the car and forced through a tube system outwardly of the car. In the embodiment of FIGS. 1 and 2, the tube system includes a single tube 5 which has a front end connected with an outlet or pressure side of the exhaust fan 2. The tube 5 extends toward a rear window 6 of the car and has an outlet end which opens outwardly of the car in this region. Therefore the defective air is evacuated from the interior of the car outwardly during the operation of the exhaust fan, through the outlet end 7.

Figure 3:
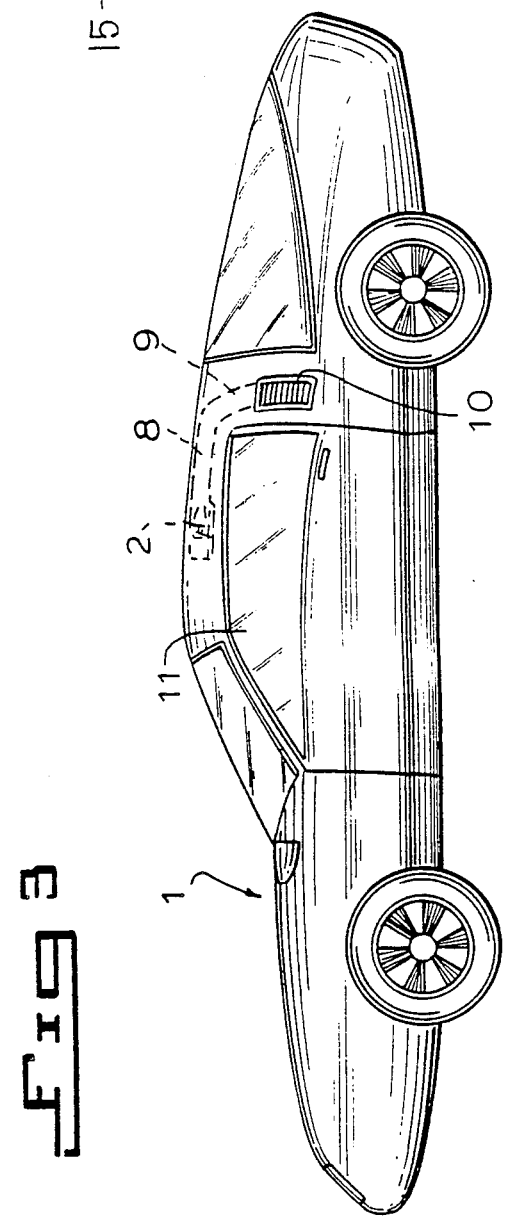
FIG. 3 is a side view of a car provided with a ventilating system in accordance with another embodiment of the present invention.

In accordance with the embodiment of FIG. 3, which illustrates a ventilating system for a car of sports model, the tube system includes a central tube 8 which extends from the exhaust fan rearwardly, and two branching tubes which extend from the rear end of the central tube 8. The branching tubes which are identified with reference numeral 9 are located in the region between the rear window 6 and a respective one of the side windows 11, to expel the defective air in these regions during the operation of the exhaust fan 2.

Figure 4:
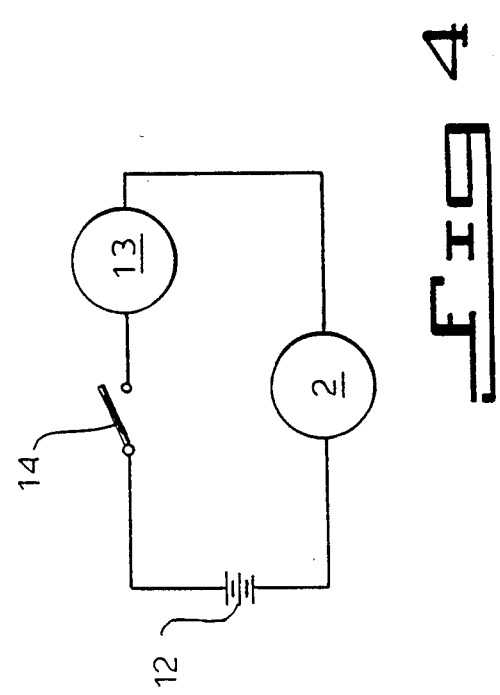
FIG. 4 is a view which schematically shows a circuit for main units of the ventilating system in accordance with the present invention.
Figure 7:
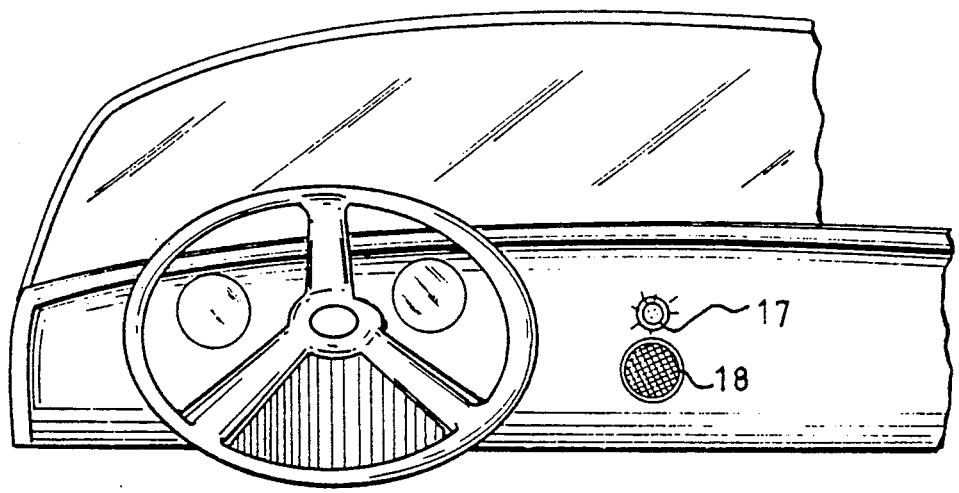
FIG. 7 is a view showing a front panel of a car with some parts of the inventive device.

The exhaust fan is provided with a power source. In accordance with an advantageous feature of the present invention, the power source which is identified with reference numeral 12 in FIG. 4 is separate from other power systems of the car. It can be formed, for example, as a battery. In this case the exhaust fan can operate even when other systems of the car are turned off. On the other hand, it is to be understood that the exhaust fan can be connected with the power systems of the car, if so desired.

The exhaust fan and intake system is further provided with a circular rotatable cover 15 having a plurality of triangular pie shaped holes located through the cover 15 corresponding to a disc 16 having corresponding pie shaped holes, such that the pie shaped holes of the cover 15 and the disc may be fully aligned in an open position or partially aligned to adjust the amount of the incoming air into the system. The round cover rotates so that the surface area of the opening holes may be increased or decreased manually as the cover is rotated clockwise or counter clockwise. As a safety device, the holes may be screened to prevent the insertion of children's fingers.

The ventilating system is further provided with means for sensing a defective air. The sensing means includes a carbon monoxide detector which is identified with reference numeral 13. When the detector 13 senses the presence of carbon monoxide above a respective level, it immediately turns on the exhaust fan 2, which starts operating and evacuates the defective air with carbon monoxide from the interior of the car. The sensing means also includes a smoke detector 23 or another detector which can be utilized for sensing the defective air. It is also connected with the exhaust fan 2 and activates it when respective impurities are sensed in the air inside the car by this detector or detectors.

The ventilating system of the present invention is also provided with a manual switch 14 which is actuated manually by a user or car occupant at will. In many instances, for example when a car passes areas with bad smell and the outside air penetrates into the car, the automatic sensor does not detect air deficiency and it is not desired to use the air conditioning system since it will draw the outside air into the car. However, a car occupant feels very uncomfortable, breathing in the thus contaminated air. In this case, the user turns on the manual switch 14 and activates the exhaust fan for evacuating the contaminated air from the interior of the car. The provision of both the automatic system and the manual system of ventilation makes the inventive ventilating arrangement more universal and practical.

Additional safety measures can be taken in accordance with the present invention to make sure that even in the event of malfunction of automatic ventilation system carbon monoxide contamination is prevented. In accordance with the present invention, the carbon monomide detector is connected with a visual signal indicator 17 which can be formed as a signal lamp. If the line between the detector 13 and the exhaust fan 2 becomes inoperative for any reason, the signal lamp 17 will emit signal light since it is activated by the carbon monoxide detector 13. When the car occupant sees the warning signal of the signal lamp 17, it actuates the manual switch 14 and thereby activates the exhaust fan.

Instead of or in addition to the signal lamp 17, an audio signal indicator 18 formed as a speaker can be provided and also connected with the detector 13 to produce the audio warning to the car occupant about the presence of carbon monoxide. When the car occupant hears the warning, he or she turns on the exhaust fan 2 by the manual switch, to evacuate the defective air from the interior of the car.

Figure 8:
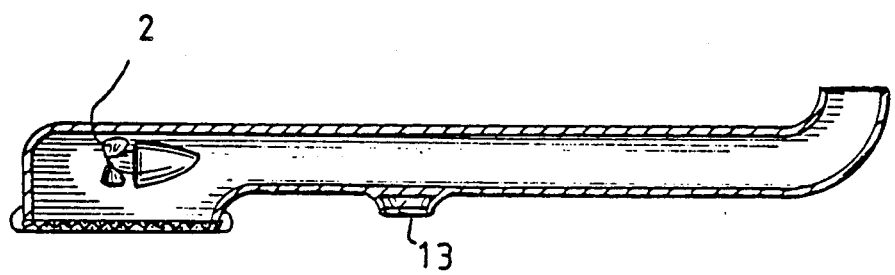
FIGS. 8 and 9 are sectional views of units of the inventive device in accordance with two embodiments of the invention.

FIG. 8 shows an embodiment in which the exhaust fan 2, the tube, and the carbon monoxide detector 13 together form a unit which is insertable and mountable as a whole in a car. The outlet end of the tube is somewhat bent upwardly so as to be easily extended through the car roof outwardly of the car.

Figure 9:
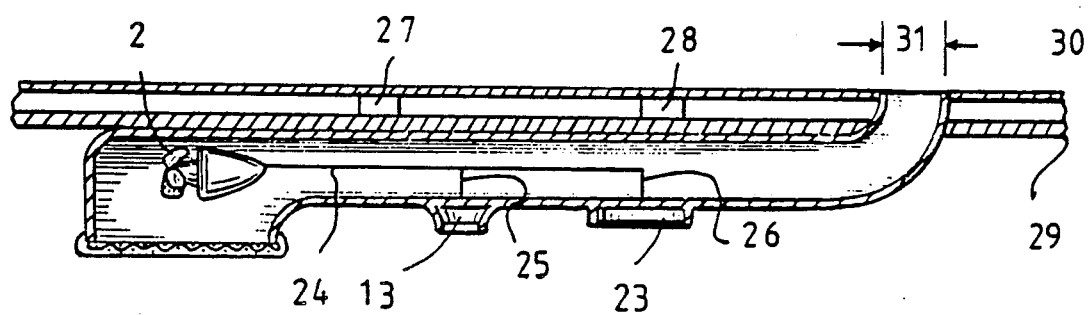

In FIG. 9 the exhaust fan 2, the tube, the carbon monoxide detector 13 and the smoke detector 23 together form a unit which is insertable and mountable as a whole in the car. The constructions of FIGS. 8 and 9 are very easy to install in existing cars with only insignificant mounting works for attaching the above described units to the car roof.

The removable mounted unit comprises the channel or tube having a tube which has a downwardly extending flange for the introduction of exhaust air and a connecting tube having detector means located on the bottom side of said connecting means and said connecting tube extending rearwardly and then upwardly out to expel the exhaust air.

As also shown in FIG. 9 fan 2 is connected electrically to detectors 13 and 23 by means of wires 24, 25 and 26. Bracket means 27 and 28 are attached to the inner surface 29 of the roof of vehicle 1. The unit exits through the upper, outer roof section 30 of vehicle 1 in space 31 of the roof of said vehicle. In another embodiment for sports models, the outlet end of the tube means may be constructed so as to exit not upwardly, but outwardly to the side through the vertical portion of the roof of car 1.

The invention is not limited to the details shown since various modifications and structural changes are possible without departing in any way from the spirit of the invention.

What is desired to be protected by Letters Patent is set forth in particular in the appended claims.

I claim:

1. A ventilating arrangement for a car, comprising an exhaust fan arranged to be located inside a car;
   tube means extending from said exhaust fan so as to lead outwardly of the car, so that said exhaust fan can expel a defective air from an interior of the car outwardly through said tube means;
   means for sensing a defective air inside the car and formed so that said sensing means turns on said exhaust fan in response to sensing the defective air, said sensing means including a gaseous detector in the interior of the car such that in response to sensing of gaseous substances in the interior of the car said detector turns on the exhaust fan;
   connecting means for electrically connecting said detector and said fan;
   said tube means being connected with said exhaust fan and said detector so that they form together a unit which is removable from the car and introducable and mountable in the car as a whole;
   said tube means having a tube with a downwardly extending flange for the introduction of exhaust air and with a tube end extending rearwardly and then upwardly to expel exhaust air;
   said rearward and upward extending tube end being mountable through a hole in a body of the car; and
   attaching means to attach said tube means to the body of the car.

2. A ventilating arrangement as defined in claim 1, wherein said rearward and upward extending tube end is mountable through a roof of the car.

3. A ventilating arrangement as defined in claim 1, wherein said tube means houses said connecting means, said tube means together with said exhaust fan, said detector and said connecting means form said unit which is removable from the car and introducable and mountable in the car as a whole.

4. A ventilating arrangement as defined in claim 1; and further comprising a second gaseous detector and a second connecting means for electrically connecting said second gases detector and said fan, said tube means being connected with said second gaseous detector and housing said second connecting means, said tube means together with said exhaust fan both said detectors and both said connecting means form said unit which is removable from the car and introducable and mountable in the car as a whole.

* * * * *